United States Patent [19]

Wurster

[11] 4,016,994
[45] Apr. 12, 1977

[54] MOBILE VACUUM AND PNEUMATIC UNIT

[76] Inventor: Wilfred A. Wurster, 7085 Gainer Road, Niagara Falls, Ontario, Canada, L2E 6S5

[22] Filed: Sept. 16, 1975

[21] Appl. No.: 613,818

[52] U.S. Cl. .................................. 214/508; 55/215; 55/446; 214/83.28; 302/23; 302/59; 261/79 A
[51] Int. Cl.$^2$ ..................... B60P 1/04; B60P 1/60; B65G 53/28
[58] Field of Search ........................... 302/21–23, 302/27, 28, 53, 59; 214/508, 83, 28; 222/195; 261/79 A; 55/215, 257 R, 257 C, 319, 446

[56] References Cited

UNITED STATES PATENTS

| | | | |
|---|---|---|---|
| 692,106 | 1/1902 | Bedarrides | 302/59 |
| 1,417,052 | 5/1922 | Gasteiger | 302/59 |
| 2,803,847 | 8/1957 | Hobbs | 214/83.28 |
| 2,901,133 | 8/1959 | Weller | 214/83.28 |
| 3,069,205 | 12/1962 | McIver et al. | 302/21 |
| 3,307,646 | 3/1967 | Hage | 302/23 |
| 3,374,910 | 3/1968 | Hermanns | 302/21 |
| 3,378,310 | 4/1968 | Christensen | 302/21 |
| 3,424,501 | 1/1969 | Young | 302/21 |
| 3,620,575 | 11/1971 | McIver et al. | 302/21 |
| 3,929,261 | 12/1975 | Solimar | 302/53 |

FOREIGN PATENTS OR APPLICATIONS

| | | | |
|---|---|---|---|
| 768,227 | 8/1934 | France | 302/23 |
| 1,255,426 | 1/1960 | France | 214/83.28 |
| 1,127,155 | 9/1968 | United Kingdom | 302/5.9 |

Primary Examiner—Johnny D. Cherry
Assistant Examiner—Jeffrey V. Nase
Attorney, Agent, or Firm—Donald E. Hewson

[57] ABSTRACT

A mobile vacuum and pneumatic unit of the sort which is usually truck mounted and self-contained is disclosed. The unit usually has two independent tanks, side-by-side, and two vacuum units which may be operated independently or in aiding relationship. Generally, one of the vacuum units is a liquid seal pump operating at nearly 29 inches of mercury, and the other is a high volume blower operating at about 20 inches of mercury. Valving arrangements are provided whereby a three-way valve permits vacuum communication from an exhaust header duct connected to the tanks to either or both of the vacuum units; with an additional valving arrangement at the input side to the tanks to select either or both. The output of the blower may be returned to one or both of the tanks to pressurize them. Thus, both tanks may be used for vacuum collection of material, from which the material may be expelled using the output of the blower; or one tank may be used for vacuum collection while at the same time material in the other tank is being expelled; or the material in the tanks may be fluidized by injecting air from the output of the blower, even if the tank is operating under vacuum. The tanks are tiltable about a horizontal axis at their rear, so that material in the tanks may be dumped as well as being blown from the tanks. The unit may be used with dry material, damp or wet material, or such materials as spilled crude oil — either on water or land.

10 Claims, 12 Drawing Figures

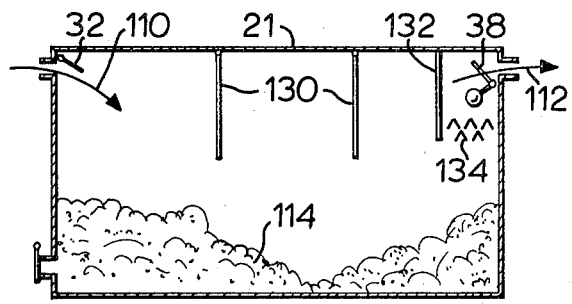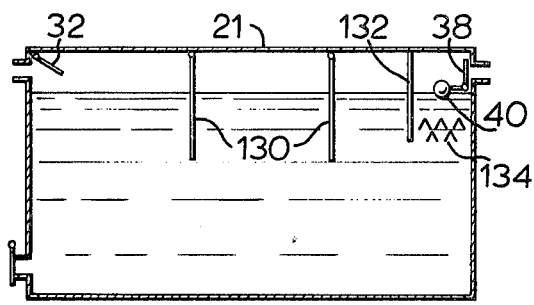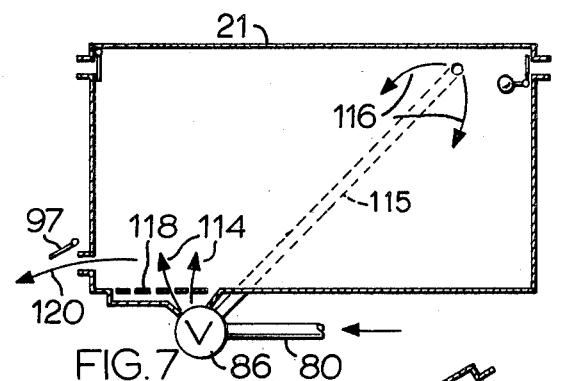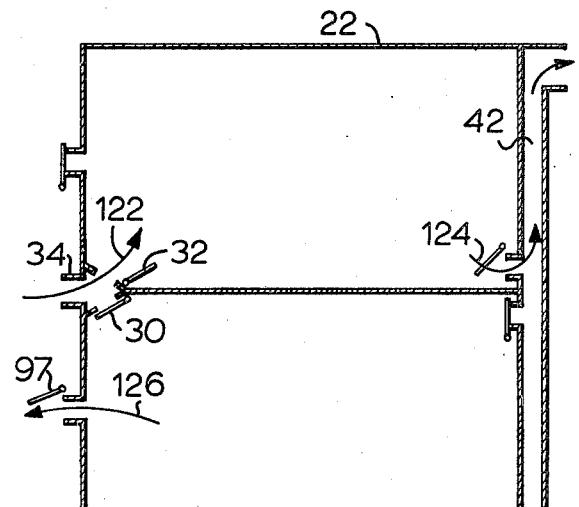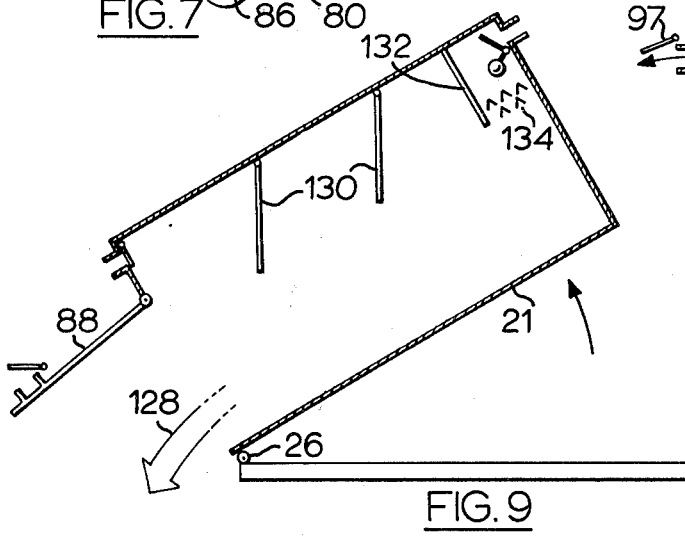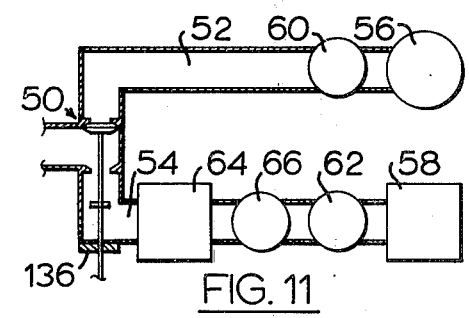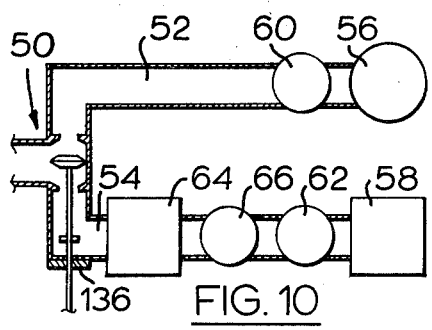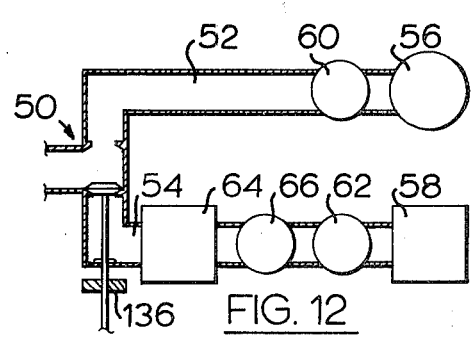

MOBILE VACUUM AND PNEUMATIC UNIT

FIELD OF THE INVENTION

This invention relates to vacuum and pneumatic units; and particularly, this invention relates to mobile vacuum and pneumatic units of the industrial and commercial type which are generally truck mounted and self-contained. The invention finds its usefulness in many fields, such as removing dry and dusty materials from bins, unloading material from the cargo holds of ships, cleaning catch basins and industrial dump ponds and the like, removing oil — particularly spilled crude oil — from the surface of water or off a ground surface; where any of the materials handled may be very dry and dusty, damp or wet.

BACKGROUND OF THE INVENTION:

Very large, mobile vacuum units of the sort which are truck mounted have been known for some time. Generally, such units have amounted to very little more than over-sized vacuum cleaners of the sort found in the home or workshop. In other words, a collector box or tank of some sort is provided, having a snorkel or suction hose at one end, and an attachment to an air blowing unit at the other end. Crude filtering means are often provided, usually screens, bags or precipitators. Such units are generally only useful for dry material, such as heat or grain, dry limestone, catalytic materials, millscale, etc. When damp materials such as wet flue dust, wetted ore pellets and coal, slaked lime and so on are collected using industrial mobile vacuum units as known heretofore, the materials have tended to agglomerate or cake in the ducts and tubes, or within the collecting box or tank — usually because of insufficient filtering or an inability to fluidize the material. In addition, dumping the material is sometimes difficult, especially where the tank or collector box cannot be tilted.

A very definite need exists for a mobile vacuum and pneumatic unit which may be used continuously to withdraw material — wet or dry — from one place and to discharge that material to another. If the material is in a cargo hold, a catch basin or other relatively inaccessible place, ordinary conveyors may not be usable. Heretofore, it has been known to use a single tank mobile vacuum unit of the usual type, and to collect material until the tank is full, stop the collecting operation and blow the tank to discharge the material therein in the designated place. However, such intermittent operation may not always be satisfactory; but an almost continuous operation where the off time is only as long as may be required to adjust a valve setting, can be acceptable.

The use of float valves to shut off or close a collector box or tank with respect to the vacuum source is well known. However, if the unit is to be adapted so as to accommodate wet or dry material, and of fine particulate size or lumpy material, suitable means should be provided to preclude inadvertent and unnecessary operation of the float valve because of its reaction to being contacted by material which is not at the effective shut-off height for that tank. Such means include suspended baffles within the tank; and as well, a primary knock-out screen — a mechanical screen — may be installed within the tank.

In view of all of the above drawbacks and shortcomings of the prior art devices, it has been suggested to provide a mobile vacuum and pneumatic unit having two tanks. Such a solution was, indeed, proposed in Young U.S. Pat. No. 3,424,501 dated Jan. 28, 1968. which disclosed a two-tank system. However, that system requires the use of both tanks because the first tank is a collector tank which operates at negative pressure, and the second tank is a filter backwash and conveyor tank which operates at positive pressure. Only a single air flow energizer is provided. (The patent also teaches that the use of a single tank, having intermittent operation thereof, may be provided.)

This invention, on the other hand, provides a mobile vacuum and pneumatic unit which may be used for collecting storing and discharging air conveyable materials of all sorts, and which consists of a mobile frame having a power source — usually a truck body although a large towable float might be used for land operation, or a boat such as a tug or trawler might be used for water-based operation. Usually two tanks for collecting and storing the air conveyable materials are provided, and two separate air energizers or means for creating a vacuum are provided. Suitable valve arrangements are made so that at least one or more than one of the tanks may be selected for collecting and storing of material at one time, by communicating the selected tank or tanks through inlet valves thereof with an inlet port connected to an intake hose or snorkel, for example. Each of the tanks is provided with a float operated valve, and communicates through that valve to an exhaust header duct. The exhaust header duct communicates through air filtering and cleaning devices — such as a venturi scrubber and a demister — to a three-way valve which has an inlet and two outlets and means within the valve so that the inlet can be in communication with either or both of the two outlets. The two vacuum air energizers are connected respectively to each of the two outlets of the three-way valve; and the outlet of at least one of the air energizers is connected through yet a further valve so that it may exhaust either to the atmoshpere or communicate at a positive pressure back to any one or a plurality of the work tanks.

Thus, the present invention provides an apparatus which is mobile and self-contained, and which has vacuum and pneumatic operation. Any tank, even if it is in vacuum communication with an air energizer to pull a vacuum within that tank, may also be connected in pressure communication with the output of a blower so that the material within the tank may be fluidized if necessary; or the tank may be pressurized to expel the material in it.

BRIEF SUMMARY OF THE INVENTION

The principle object of this invention is, therefore, to provide a mobile vacuum and pneumatic unit which may be used in a substantially continuous fashion to collect, store and discharge air conveyable materials.

A further object of this invention is to provide a mobile vacuum and pneumatic unit which is capable of handling materials over the range of dry and dusty materials, damp materials, wet materials, lumpy materials, materials having a fine and uniform particulate size, slurries and crude oil.

Still another object of this invention is to provide a mobile vacuum and pneumatic unit for collecting, storing and discharging air conveyable materials which can be mounted to a mobile frame such as a truck body usng substantially "off-the-shelf" valving and air energizer components.

BRIEF DESCRIPTION OF THE DRAWINGS

These and other objects and features of the present invention are more clearly described hereafter, in the following discussion taken in association with the accompanying drawings, in which:

FIGS. 5 to 9 inclusive are schematic representations of different modes of operation of a mobile vacuum and pneumatic unit according to this invention; and FIGS. 10 to 12 inclusive are schematic views showing different valving arrangements of the air energizer portion of a mobile unit according to this invention.

DESCRIPTION OF THE PREFERRED EMBODIMENTS

Figure 1:
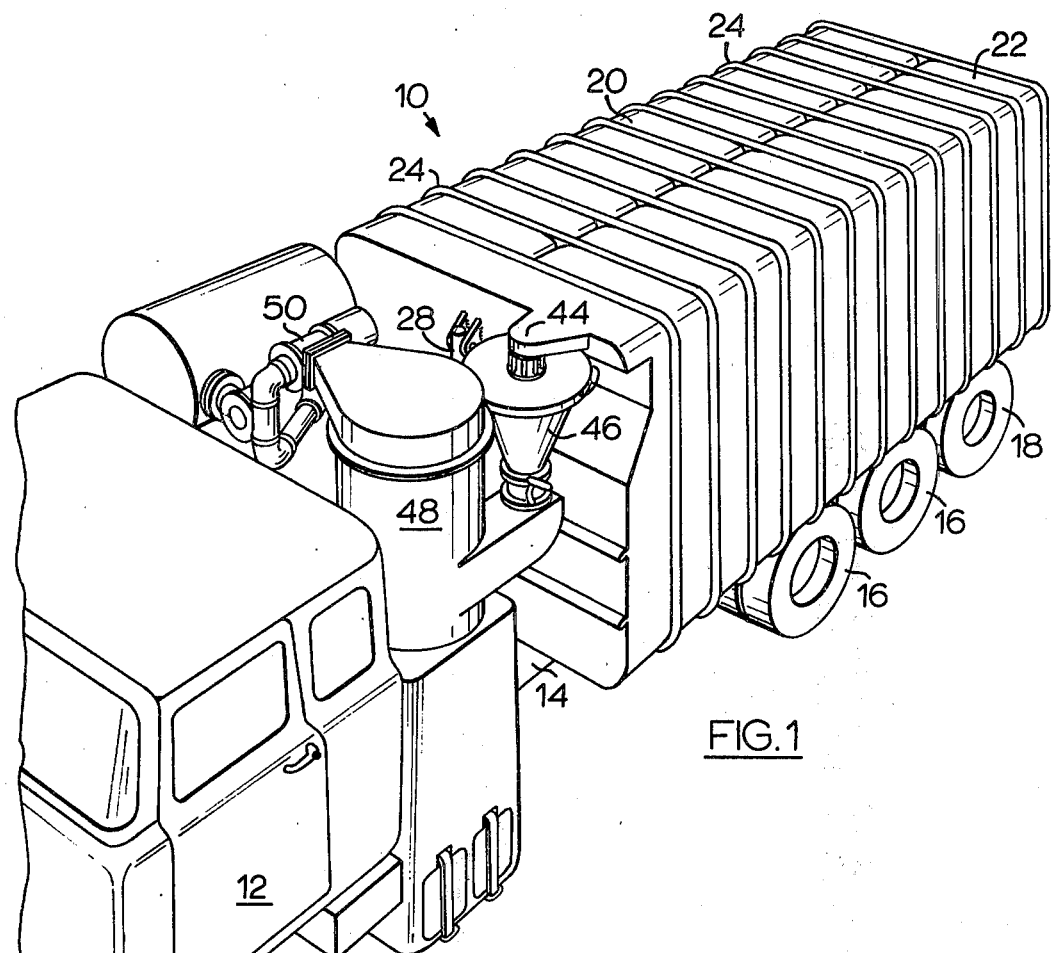
FIG. 1 is a perspective view of a truck mounted mobile vacuum and pneumatic unit according to this invention.
Figure 2:
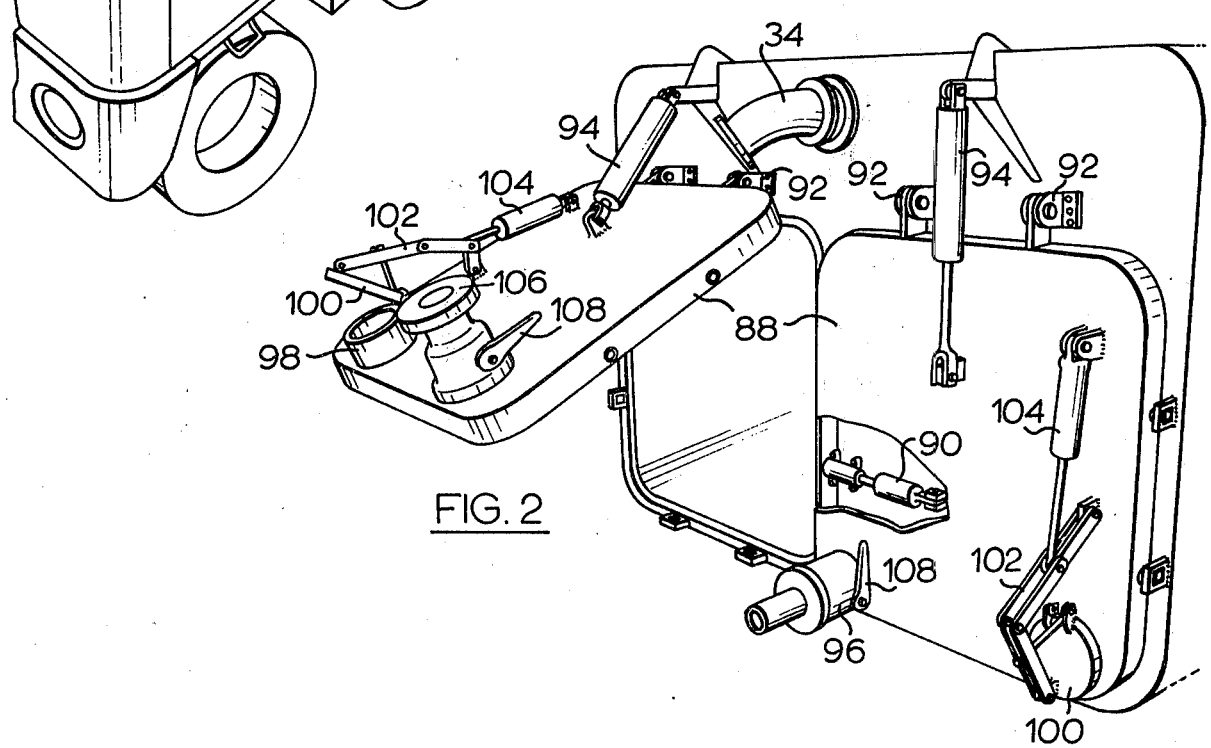
FIG. 2 is a perspective view of the rear end of the mobile unit of FIG. 1, showing one dump door in the open position.
Figure 3:
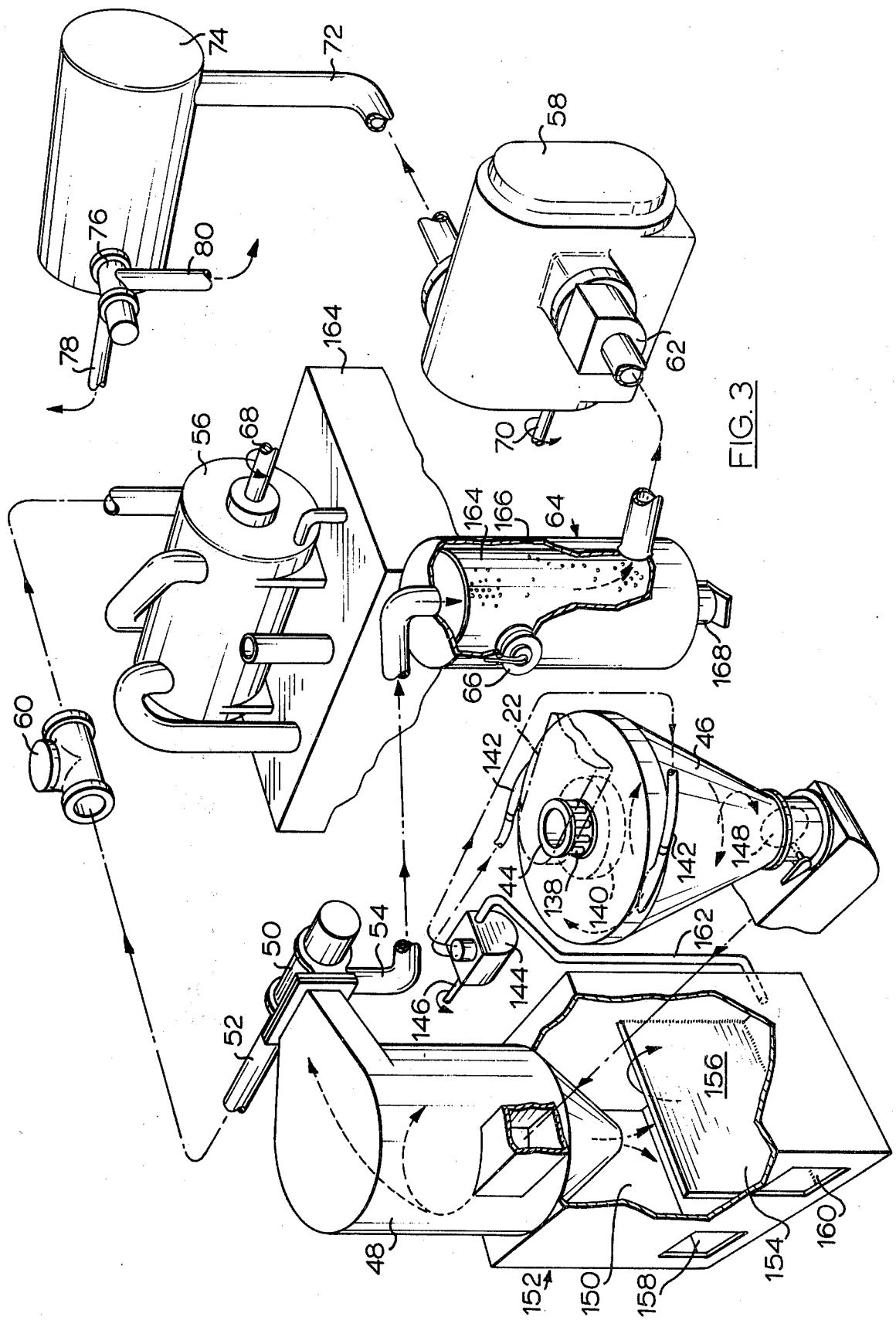
FIG. 3 is a partial schematic and perspective view showing the inter-relationships of the various components which comprise the vacuum or air energizer portion of a mobile unit according to this invention.

As noted above, the present invention relates particularly to a mobile vacuum and pneumatic unit of the sort which is self-contained and which may be truck mounted. Thus, there is shown in FIG. 1 a mobile vacuum and pneumatic unit designated generally at 10 which is mounted on a truck having cab 12, rear chassis 14 and drive wheels 16. The rear wheels 18 are, in one commercial embodiment, equipped with load lifters and are used only when the weight of the load being carried increases beyond a certain limit. Mounted over the rear chassis 14 are a pair of tanks 20 and 22, each of which is independent of the other except that they communicate with mutual valving arrangements as discussed in greater detail hereafter. The tanks are banded by external ribs 24, it being borne in mind that the tanks may work at vacuum of up to 29 inches of mercury, and also in similar pressure ranges under certain conditions.

The tanks 20 and 22 are tiltable by being hinged about a rear horizontal axis indicated schematically at 26 in FIG. 9. The tilting arrangement is accomodated by a hydraulic cylinder 28 at the front of the tanks. A suitable source of power for operating the air energizers of the mobile vacuum and pneumatic unit may be mounted on the rear chassis 14, or it may be the engine of the mobile unit which is situated beneath the cab 12. Suitable power take-off provisions which are otherwise irrelevant to this invention may be made.

Figure 4:
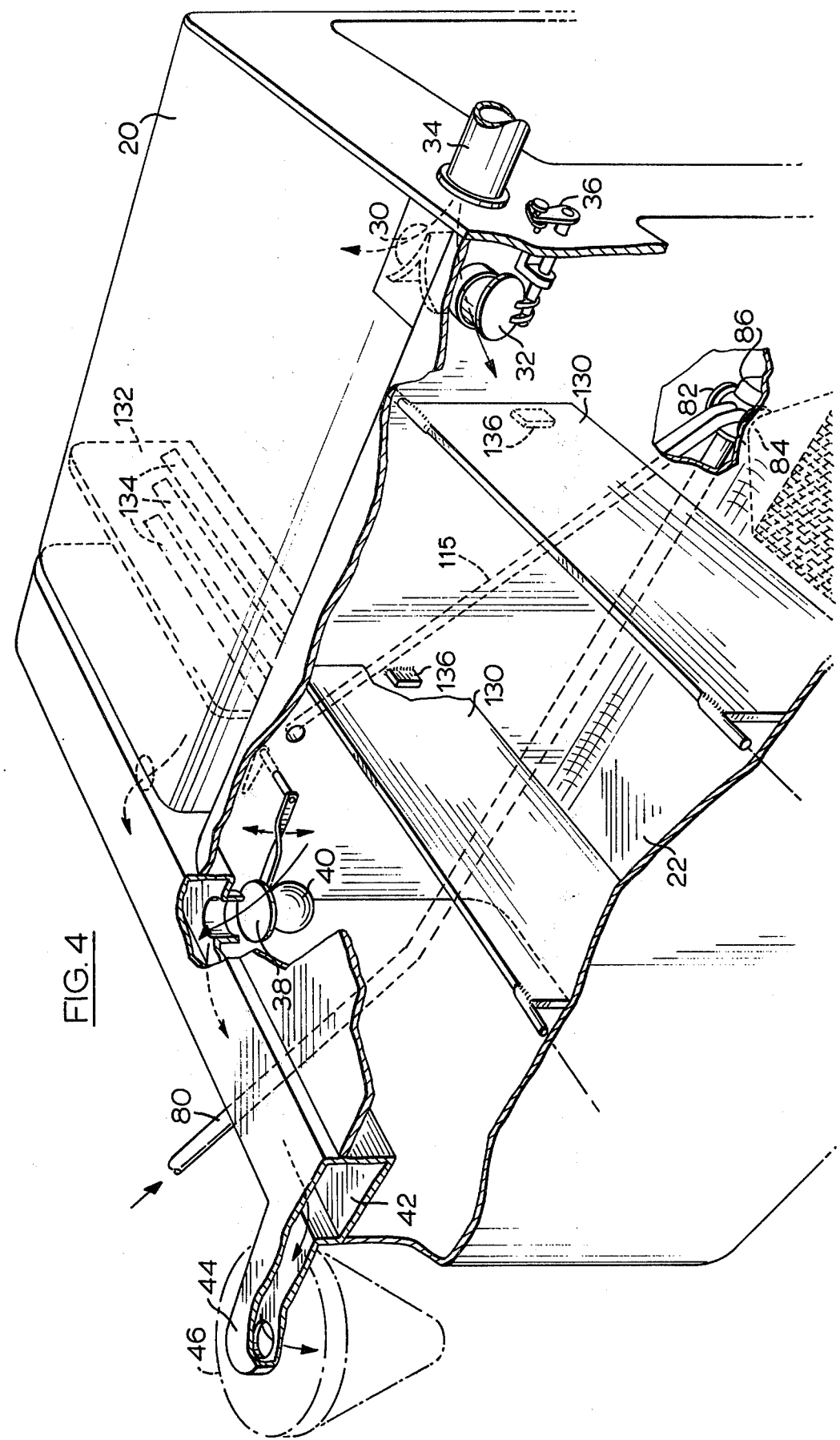
FIG. 4 is a perspective, partially broken away view of the work tanks of a mobile unit according to this invention.

Other than the work tanks 20 and 22, the principle components of this invention include inlet valves 30 and 32 on tanks 20 and 22 respectively, inlet port 34 which is connected to the inlet valves 30 and 32, and control means such as control 36 which is provided for selectively communicating whichever or both of inlet valves 30 and 32 shall provide communication from the inlet port 34 into at least one of the tanks 20 and 22 (see FIGS. 4 and 8). A float operated valve 38 having a float 40 is provided at the front of each of the work tanks, and each of the float operated outlet valves 38 communicates to an exhaust header duct 42. The exhaust header duct 42 communicates through a break away connection 44 to air filtering and cleaning means which, in the preferred embodiment, includes a venturi scrubber 46 and a demister 48, and thence to a three-way valve 50. The inlet of the three-way valve 50 faces the header duct 42, and the two outlets of the three-way valve 50 are connected to pipes 52 and 54 which, in turn, communicate with a high vacuum, liquid seal pump 56 and a high volume blower 58, respectively. A check valve 60 is included in the line 52; and a check valve 62 and filter 64 with safety valve 66 are in the line 54. The pump 56 has a power input shaft 68, and the blower 58 has a power input shaft 70, each of which is suitably connected to a source of power carried by the mobile vacuum and pneumatic unit.

The output of the liquid seal pump 56 is vented to atmosphere, and the output of the blower 58 is led through a line 72 to a silencer or muffler 74. A pressure valve 76 — which again, is a three-way valve — is on the outlet side of the silencer 74, and is arranged to communicate the outlet of the blower 58 either to atmosphere through line 78, or back to the work tanks 20 and 22 through line 80. As will be noted hereafter, the pressure valve 76 provides a means for communicating the outlet of blower 58 to a pressure inlet valve 82 or 84 of tanks 20 and 22 respectively; and yet another three-way valve 86 is provided so as to selectively connect the pressure line 80 to one or the other, or both, of tanks 20 and 22. Of course, if the float valve 38 of either tank is open, a vacuum is being drawn in the respective work tank; but small quantities of air from the pressure line 80 may be bled into either of the work tanks, as discussed in greater detail hereafter, so as to fluidize the material within the tanks.

At the rear of each of the work tanks 20 and 22 there is situated a dump door 88 which may be latched in a closed position by hydraulic latches 90 and which may be opened by swinging the dump door 88 about the hinges 92 using hydraulic cylinder 94. Two other means for providing an outlet from each of the work tanks 20 and 22 are also provided on the dump door 88 so that, if it is not desired or not necessary to open the dump door 88, the material within the respective work tank 20 or 22 may still be expelled therefrom either through an outlet port 96 or a dump port 98. Each of the dump ports 98 has a dump port cover 100 which is operated through an over-centre linkage 102 driven by an hydraulic cylinder 104. The outlet ports 96 may have a flange 106 arranged therewith for connection of the outlet port to such other apparatus as a pipe line or conveyor line; and each of the outlet ports 96 may be opened by actuating a valve having control 108.

So far, it will be seen that the three-way valve 50 may be operated to have one or the other of pump 56 and blower 58, or both, creating a vacuum within one or the other of work tanks 20 and 22, or both. The vacuum is communicated from the vacuum air energizer which may be pump 56 or blower 58 through the exhaust header duct 42; and whichever or both of tanks 20 and 22 is operated under vacuum is determined by the positioning of the respective inlet valve 32 thereof. At the same time, either tank 20 or 22 may be in pressure communication with the outlet of the blower 58 through pressure line 80. If, for example, tank 20 is operating under a vacuum and work tank 22 is full of a material which may be expelled therefrom by pressurizing and blowing the tank, such simultaneous operation of the tanks may be arranged.

Referring now to FIGS. 5 to 9, there are shown schematically a number of different operations of a typical work tank, designated 21 in FIGS. 5, 6, 7 and 9; and a simultaneous vacuum and pressure operation in tanks 22 and 20 in FIG. 8. Turning to FIG. 5, the intake port 32 is shown to be open, with a flow into the tank 21 as shown by the arrow 110. There is air flow out of the tank 21 through the outlet valve 38, as shown by arrow 112. Material indicated generally at 114 is shown to have accumulated in the bottom of the tank 21.

In FIG. 6, the oulet valve 38 is shown to be closed, under the influence of the float 40; and although the inlet valve 32 is shown to be open, the tank is no longer under vacuum. The float 40 is operative when the level of the material in the tank reaches a pre-determined level, as discussed in greater detail hereafter.

In FIG. 7, a tank 21 is shown to have air entering it from pressure line 80 through three-way valve 86 and also through a distribution valve which is such that some of the air flow enters the tank at the bottom thereof as shown by arrows 114, and also from duct 115 to the upper region thereof as shown by arrows 116. Communication of the pressure line 80 into the tank at the bottom thereof is through a plurality of flap valves 118 which may be comprised of flaps of suitable material such as natural rubber or neoprene. An outlet indicated generally as 97 is shown to be open, with flow therethrough as indicated by arrow 120; and in such operation, the tank 21 is being pressurized so as to expel material therefrom. At the same time, the material within the tank 21 is being fluidized by the flow of air from the bottom and through the upper portion of the tank, as required depending on the nature of the material. As indicated above, however, it may be that the pressure line 80 has a slight communication with the tank 21 even if the tank is operating under vacuum as shown in FIG. 5, in which case the material being collected into the work tank 21 is being fluidized while it is being held or stored therein, notwithstanding the vacuum operation thereof.

In FIG. 8, air flow into tank 22 is indicated by arrow 122, and out of the tank by arrow 124. The flow out of the tank is to the header duct 42, and thus the work tank 22 is operating under vacuum. At the same time, work tank 20 is shown to have material flow outwardly through the outlet 97 as indicated by arrow 126; and thus the work tank 20 is being operated under pressure simultaneously with the vacuum operation of work tank 22.

In FIG. 9, the box 21 is shown to be tilted around the rear horizontal axis 26, with the dump door 88 being opened. The material that has been stored within the tank, in this case, is dumped therefrom, as indicated by arrow 128.

Within the work tanks 20 and 22, there are suspended baffles, usually two baffles 130 at one-third and two-thirds intervals along the length of the tank. Baffles 130 preclude the direct flow of solids from the inlet 32 to outlet 38 of a work tank, and serve to maintain the operation of the float 40 accurate. The float 40 may either directly control the operation of the valve 38, or indirectly by controlling the operation of an indicator or alarm which are under the scrutiny of the operator of the apparatus. In addition, a guard baffle 132 and a primary knock-out screen 134 may also be mounted in the tank. The primary knock-out screen 134 may take the form of a plurality of inverted angle irons, with the apex facing upwardly in each instance, Because the baffles 130 are suspended, stops 136 may be provided to preclude their swinging forward under the influence of the flow of air and material within the tank.

Referring now to FIGS. 10, 11 and 12, three basic positions of the three-way valve 50 are indicated. In FIG. 10, the three-way valve 50 is shown to be open such that its inlet communicates to both outlets, and thence in turn to lines 52 and 54. Line 52 leads to check valve 60 and pump 56, and line 54 leads to filter 64, safety valve 66, check valve 62 and blower 58. In FIG. 11, the three-way valve 50 is shown to be seated in such a manner that only the blower 58 is creating a vacuum. In FIG. 12, the three-way valve 50 is seated in such a way that only the pump 56 is creating a vacuum in the work tanks; however, a relief valve 136 is lifted off its seat in FIG. 12 to provide air flow to the blower 58 notwithstanding that the blower 58 is not connected on its vacuum side to the work tanks. In the circumstances illustrated in FIG. 12, therefore, the blower 58 may be utilized so that its output is pressurizing a tank and/or fluidizing the material within a tank; and in any event, the blower 58 need not be de-coupled from its power source — thereby eliminating the necessity for expensive clutches and the like.

It has been noted above that a vacuum and pneumatic unit according to this invention may be used with a great variety of materials which may be dry, damp or wet, slurry or crude oil and which may have fairly even particulate size or be quite lumpy with very large — several inches in diameter — chunks or lumps of material. It is only necessary that the material be capable of being air conveyable, so that it may be picked up or drawn into a snorkel connected to the intake connection pipe 34 in the first instance. Such materials may include dry materials such as boxite or millscale; damp or wet materials such as those to be found in catch basins and industrial ponds, wet flue dust, dampened coal or ore pellets, and the like. Also, as noted, the material may be such as spilled crude oil, either on the surface of water or on the ground.

In many cases, the material is such that it may be quite dirty or dusty; and so as to recover as much of the material as possible from the air with which it was carried — thereby protecting the air energizers such as pump 56 or blower 58 — air filtering and cleaning equipment is provided by the present invention in such a manner that nearly all of the material — even the very finest — that is carried into the mobile vacuum and pneumatic unit is recovered from the air flow before the flow comes to the pump or blower to which it is being directed Thus, the present invention provides a venturi scrubber 46 having a breakaway connection 44 thereon to accomodate the tilting of the tanks 20 and 22, and communicating with the exhaust header duct 42 which, in turn, communicates with each of the tanks 20 and 22 — or as many tanks as may be provided.

The venturi scrubber 46 has an inlet 138 having a relatively small diameter, and an interior lead-down pipe 140 of greater diameter. Thus, the speed of flow of air through the lead-down pipe 140 is less than that through the inlet pipe 138. Jets or streams of water are pumped into the upper periphery, substantially tangentially, through inlets 142 from a pump 144 which is suitably connected through shaft 146 to the power source. Because of the change of speed of air as it flows downwardly through the venturi scrubber, and because of the injection of water tangentially at the upper periphery of the cone of the body of the scrubber 46, any dirt being carried by the air entering the scrubber which will fall out in the lead-down pipe 140 is caught by the swirl of water formed on the inside of the cone. The water and air flow from the venturi scrubber 46 past a controllable butterlfy valve 148 to the demister 48. There, the diameter of the air passageway is very much greater so that the speed of flow of air is significantly reduced, and any water droplets being carried in the air condense and fall from the relatively slow moving air within the demister. All of the water which is recovered from the air flow in the demister 48 falls from the bottom of the demister into the first part 150 of a two-part sludge tank 152; and, of course, any other dirt that is carried by the water is also carried into the first part 150 of the sludge tank 152. A baffle 154 is formed within the sludge tank to a height less than the height of the tank, so that the baffle acts as a spillover weir for the water collected in the first part 150 of the sludge tank 152 as it rises to the height of the baffle 154 and spills into the second part 156 of the sludge tank. Thus, any sludge which is formed by dirt falling from the demister 48 together with water collects in the bottom of the first part 150, and may be cleaned therefrom through the sludge cleanout port 158 from time to time. A drain port 160 is provided in the second part 156 of the sludge tank 152. Also, a pipe 162 is connected from the second — clean water — part 156 of the sludge tank 152 to the water pump 144, so that water from the second part of the sludge tank is used in the venturi scrubber 46. In that way, the water — which is a service liquid for use in the venturi scrubber — together with any liquids which are drawn by the vacuum unit and carried as far as the demister, are all included in a single liquid circuit powered by the pump 144.

The service liquid for the high vacuum, liquid seal pump 56 is contained in a service liquid tank 164.

Also included in the line 54 from three-way valve 50 to the blower 58 is a filter 64, with a safety valve 66 situated on the filter so as to provide a communication from the atmosphere to the inlet side of the blower 58 past the check valve 62 in the event that the gauge vacuum within the filter falls or diminishes below a pre-determined minimum vacuum. That latter event may happen in the event that the filter gets clogged.

The filter comprises a perforated inner cylinder 164 and an outer shell 166; there being a space between the perforated cylinder 164 and outer shell 166. Air entering the filter 64 passes through the perforated inner cylinder 164 to the space between it and the outer shell 166, and thence to the blower 58. Any dirt which is collected in the filter 64 falls to the bottom of the inside of the inner cylinder 164. A flap valve 168 is provided at the bottom of the filter 64; and when a vacuum is being pulled in the filter 64 by the blower 58, the flap valve remains closed. However, when the blower 58 is not operating — especialy during such times when the mobile vacuum and pneumatic unit is being moved from one job site to the next, the flap valve is permitted to open and any material within the inside of inner cylinder 164 is permitted to fall out of the filter 64 past the flap valve 168.

A mobile vacuum and pneumatic unit has been described which is such that two vacuum air energizers are employed — one a pump and the other a blower — and where usually two work tanks are provided. The high vacuum, liquid seal pump which is normally used in commercial embodiments of vacuum and pneumatic units constructed according to this invention may operate at gauge vacuums in the order of 28 or 29 inches of mercury, and may have air flow up to 1,000 cfm. The blower may have utilizable vacuum operation in the order of 18 to 20 inches of mercury, and may have air flow as high as 2,000 cfm.

In some instances, where large volume flow of air is required, both units may be operated in parallel. In other cases, the blower alone may be utilized; but in such cases as the collection and storage of liquids, oils, tars, slurries, or extremely fine dust, usually the pump only is utilized. It has been noted that the material being collected in either or both of the work tanks may be fluidized by pressure outlet from the blower. It has also been noted that a vacuum and pneumatic unit according to this invention might be used for loading or unloading cargo vessels and the like; and a mobile vacuum and pneumatic unit according to this invention might be mounted on a boat for use in cleaning up spilled crude oil from the surface of water.

Several different alternatives have been shown in some instances; and many other amendments or alterations to the mobile vacuum and pneumatic unit according to this invention may be made without departing from the spirit and scope of the appended claims.

The embodiments of the invention in which an exclusive property or privilege is claimed are defined as follows:

1. A mobile vacuum and pneumatic unit for collecting, storing and discharging air conveyable materials, comprising:

a mobile frame, having a power source;

at least one tank for collecting and storing said materials;

an inlet valve for said materials in each said tank, an inlet port, and means for communicating said inlet port to said at least one tank through the inlet valve for such tank;

a float operated outlet valve in each said tank, communicating to an exhaust header duct; said exhaust header duct communicating to air filtering and cleaning means and to a three-way valve having an inlet and direct and second outlets and means for communicating said inlet to either or both of said first and second outlets;

said first outlet of said three-way valve being connected to a first means for creating a vacuum;

said second outlet of said three-way valve being connected to a second means for creating a vacuum;

each of said first and second means for creating a vacuum being connected to said power source;

pressure valve means for communicating the outlet of said second means for creating a vacuum to means for connecting said pressure valve means to a pressure inlet valve of said at least one tank;

said three-way valve being operable to have one or the other or both of said first and second means for creating a vacuum communicating to said at least one tank, whereby material may be drawn into or expelled from said at least one tank at will;

said first means for creating a vacuum being a vacuum pump, and second means for creating a vacuum being a blower;

said air filtering and cleaning means comprising a venturi scrubber and a demister, in series with and interposed between said exhaust header duct and said three-way valve.

2. The mobile vacuum and pneumatic unit of claim 1 where at least two tanks are provided for collecting and storing said materials;

said means for communicating said inlet port to a tank comprises means for selectively communicating inlet port to at least one tank through a respective inlet valve for such tank; and said means for connecting said pressure valve means to a tank comprises means for selectively connecting said pressure valve means to a respective pressure inlet valve of any of said tanks;

said three-way valve being operable to have one or the other or both of said first and second means for creating a vacuum communicating to one or more of said at least two tanks; and any tank may be connected in pressure communication with the outlet of said second means for creating a vacuum; whereby material may be drawn into or expelled from all tanks at one time, or drawn into at least one tank and expelled from at least another tank at one time.

3. The mobile vacuum and pneumatic unit of claim 2 where a silencer is connected to the outlet of said blower, and said pressure valve means may be selectively connected to any of said pressure inlet valves of said tanks.

4. The mobile vacuum and pneumatic unit of claim 3 where said pressure inlet valve of each tank communicates with ducts to distribute air into said tank from the bottom and from the upper region thereof, where communication through the bottom of said tank is through flap valves; whereby the material in the tank may be fluidized.

5. The mobile vacuum and pneumatic unit of claim 1 where said at least one tank may be tilted about a horizontal axis by being lifted at a point remote from said horizontal axis by lifting means acting at that point, and has at least one exit port for purposes of dumping the material in said at least one tank through said exit port.

6. The mobile vacuum and pneumatic unit of claim 1 where at least one baffle is suspended in each said at least one tank, and a mechanical screen is mounted in said at least one tank, and said at least one baffle and said screen are interposed between said inlet valve and said float operated outlet valve in said tank.

7. The mobile vacuum and pneumatic unit of claim 1 where a two part sludge tank is situated below said demister, and has a baffle extending from the bottom thereof to a height less than the height of the sludge tank; where the bottom of the demister communicates with the first part of said sludge tank, and said baffle acts as a spillover weir for water collected in said first part to flow into the second part of said sludge tank.

8. The mobile vacuum and pneumatic unit of claim 7, further including a circulating pump for punping water from said second part of said sludge tank to said venturi scrubber.

9. The mobile vacuum and pneumatic unit of claim 1 where a filter is interposed between said three-way valve and said blower, and comprises a perforated inner cylinder communicating with a flap valve at the bottom thereof and an outer shell surrounding said inner cylinder, so as to leave a space between them where said second outlet of said three-way valve communicates to the interior of said inner cylinder and the intake side of said blower communicates with the space between said inner cylinder and said outer shell.

10. The mobile vacuum and pneumatic unit of claim 9 where a safety valve is situated on said outer shell of said fliter, and is adapted to open when the gauge vacuum from the atmosphere to the space between said inner cylinder and said outer shell falls below a predetermined minimum vacuum.

* * * * *